March 21, 1950     A. S. LUTZ ET AL     2,501,449

ARTIFICIAL FISH BAIT

Filed Dec. 1, 1947

INVENTORS.
Arthur S. Lutz
Harold J. Lutz

BY

ATTORNEY.

Patented Mar. 21, 1950

2,501,449

UNITED STATES PATENT OFFICE 2,501,449

ARTIFICIAL FISH BAIT

Arthur S. Lutz, Kansas City, Kans., and
Harold J. Lutz, Kansas City, Mo.

Application December 1, 1947, Serial No. 788,986

2 Claims. (Cl. 43—42.3)

This invention relates to the field and sport of fishing and has to do specifically with a device for alluring such game to a hook, the primary object being to provide a lure made entirely from edible bait and contoured to simulate a live insect or animal such as a frog, not only in appearance but actions as the same is placed in the water.

The most important object of this invention is the provision of artificial fish bait made from flesh and rind of animals such as hogs, and peculiarly cut to present a flat, flexible panel, having embossments thereon, disposed and dimensioned to cause movement within itself as the lure is drawn through the water.

Another important object of this invention is the provision of a lure wherein the aforesaid embossments are of differing heights whereby water will impinge thereupon and cause bending action in the flexible panel as well as in the tail portion formed in said panel.

Other objects will be made clear as the following specification progresses, reference being had to the accompanying drawing wherein.

Figure 1:
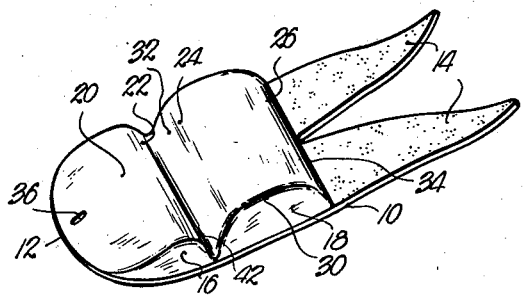
Figure 1 is a top perspective view of artificial fish bait made in accordance with the present invention.
Figure 2:
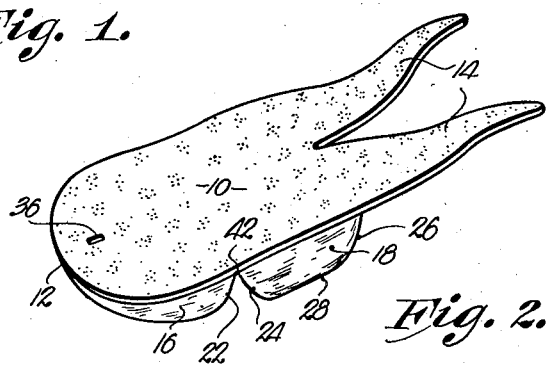
Fig. 2 is an inverted perspective view thereof.

It is common knowledge that fish are more easily enticed to a hook that has associated therewith an animated lure, particularly if such lure creates movement in itself during its travel through the water or when moving water impinges thereon. Furthermore, edible bait is much more satisfactory than that formed from other substances, and when combined with a life-like figure, an ideal bait is presented.

Bacon rind has often been used as bait and is ordinarily cut to include a part of the animal flesh. Thus, as shown in the drawing, such flexible rind is sliced to present a relatively flat, elongated panel 10, having one end thereof rounded as at 12 and the opposite end shaped to present a pair of fingers 14. These fingers 14 are preferably triangular, having their proximal edges in diverging relationship as their outermost free ends are approached.

The flesh or fat portion of the rind forming panel 10 is cut to present a pair of bosses 16 and 18 extending from panel 10. The boss 16 has an uppermost face 20 that extends from end 12 in a curve, the boss 16 progressively increasing in height from panel 10 as the innermost or rearmost end thereof is approached. This last mentioned end, designated by the numeral 22 is cut at an angle with respect to panel 10.

Figure 4:
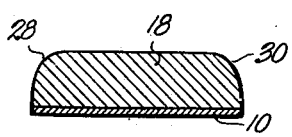
Fig. 4 is a cross sectional view taken on line IV—IV of Fig. 3.

The boss 18 on the other hand is substantially dome-shaped, the uppermost edges 24 and 26 as well as edges 28 and 30 (see Fig. 4) being rounded. And, more important, the maximum height of boss 18 is distinctly greater than that of boss 16.

The forward and rear end walls 32 and 34 respectively of the boss 18 are inclined, the walls 22 and 32 of bosses 16 and 18 respectively, converging as the normally uppermost face of the panel 10 is approached.

An opening 36 is formed in the panel 10 near end 12 thereof and in the boss 16 to receive a fish hook 38.

Figure 3:
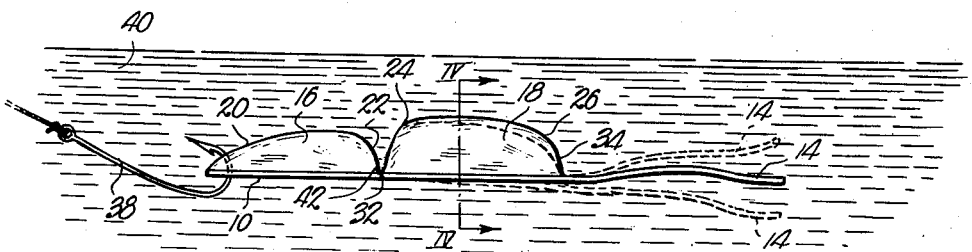
Fig. 3 is a side elevational view thereof.

When the bait just described is placed in water 40, pulling of the same through water 40, and rippling or other movement of the water will cause motion in the bait itself. Water moving across the curved surface 20 of the boss 16 will impinge on the end wall 32 of the boss 18 causing it to move downwardly as indicated by dotted lines in Fig. 3. The flexibility of panel 10 will cause the same to bend along a transverse line 42 between the bosses 16 and 18. At the same time, the fingers 14 will flutter vertically in water 40 as clearly indicated in Fig. 3.

The resemblance of the lure to a frog or the like, its life-like movement in the water, and the coloring of the panel 10 in bright hues if desired, all lend to the production of a lure that combines all the characteristics desired for such article.

Manifestly many changes may be made in contour, size, and features generally without departing from the spirit of this invention as evidenced by the appended claims.

Having thus described the invention, what is claimed as new and desired to be secured by Letters Patent is:

1. A fish lure comprising an elongated animal rind panel having one end thereof bifurcated to present a pair of flexible fingers; and a body of animal flesh on the normally uppermost face of the panel, said fingers being devoid of animal flesh, said body being affixed to the panel through natural growth therewith, said body having a groove formed therein intermediate said fingers and the opposite end of said panel extending transversely across the panel and dividing the body into a pair of bosses, whereby to present a line of bend in the panel to affect swinging movement of the fingers with respect to the body when the lure is motivated through a liquid.

2. A fish lure comprising an elongated animal rind panel having one end thereof bifurcated to present a pair of flexible fingers; and a body of animal flesh on the normally uppermost face of the panel, said fingers being devoid of animal flesh, said body being affixed to the panel through natural growth therewith, said body having a groove formed therein intermediate said fingers and the opposite end of said panel extending transversely across the panel and dividing the body into a pair of bosses, whereby to present a line of bend in the panel to affect swinging movement of the fingers with respect to the body when the lure is motivated through a liquid, said bosses being arcuate on a cross-sectional line therethrough, parallel with the longitudinal axis of the panel, the boss next adjacent the fingers being appreciably higher than the other of said bosses and said other boss progressively increasing in height from the opposite end of the panel, whereby said panel is caused to bend on said line by action of the liquid upon the bosses as the lure is moved through the liquid.

ARTHUR S. LUTZ.
HAROLD J. LUTZ.

REFERENCES CITED

The following references are of record in the file of this patent:

UNITED STATES PATENTS

| Number | Name | Date |
|---|---|---|
| 857,593 | Brown | June 25, 1907 |
| 1,593,604 | Schreiner et al. | July 27, 1926 |
| 1,993,018 | Pfeifle | Mar. 5, 1935 |

FOREIGN PATENTS

| Number | Country | Date |
|---|---|---|
| 381,372 | Great Britain | Oct. 6, 1932 |